Figure 5:
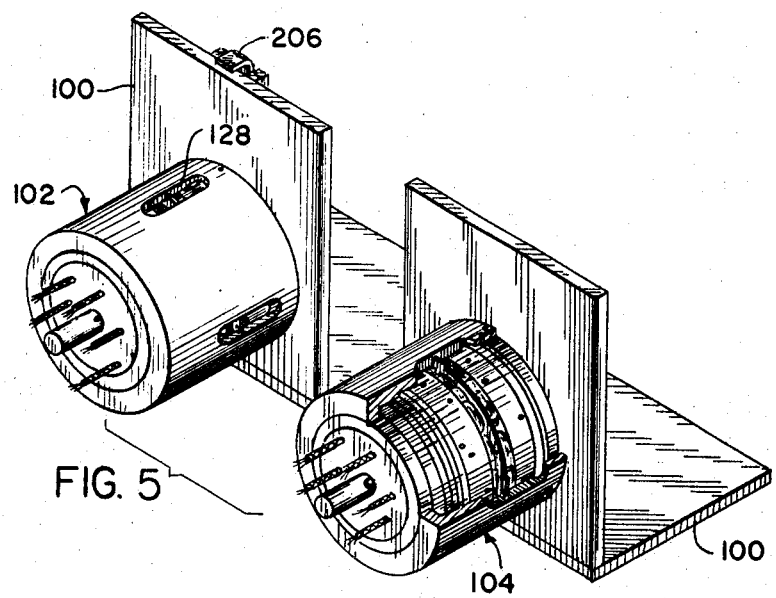

Oct. 1, 1968          J. F. GIFFORD          3,404,323
CLOSED LOOP STEPPING SERVOMOTOR SYSTEM
Filed March 10, 1964                                6 Sheets-Sheet 1
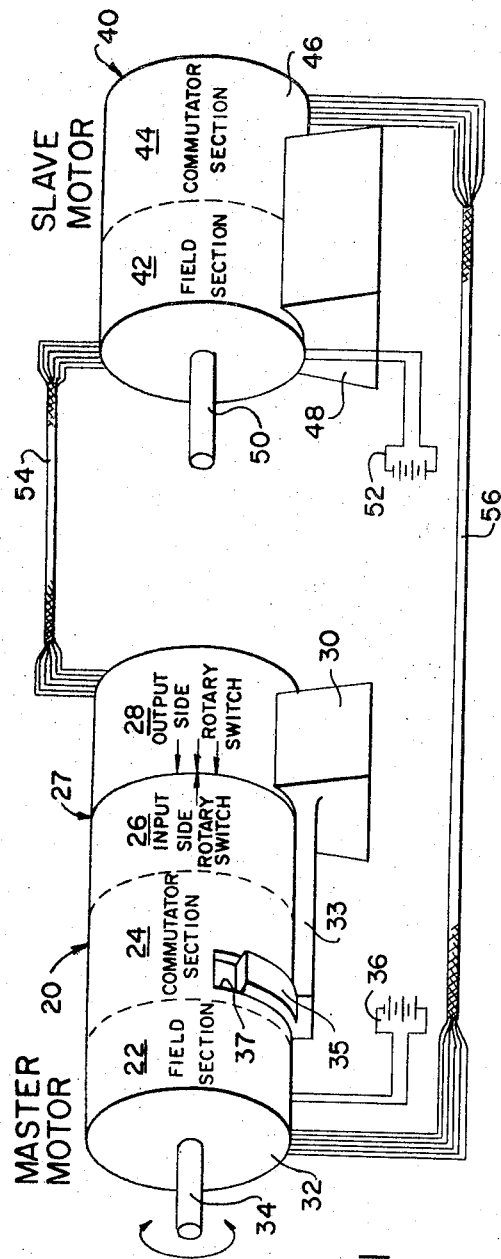
FIG. 1
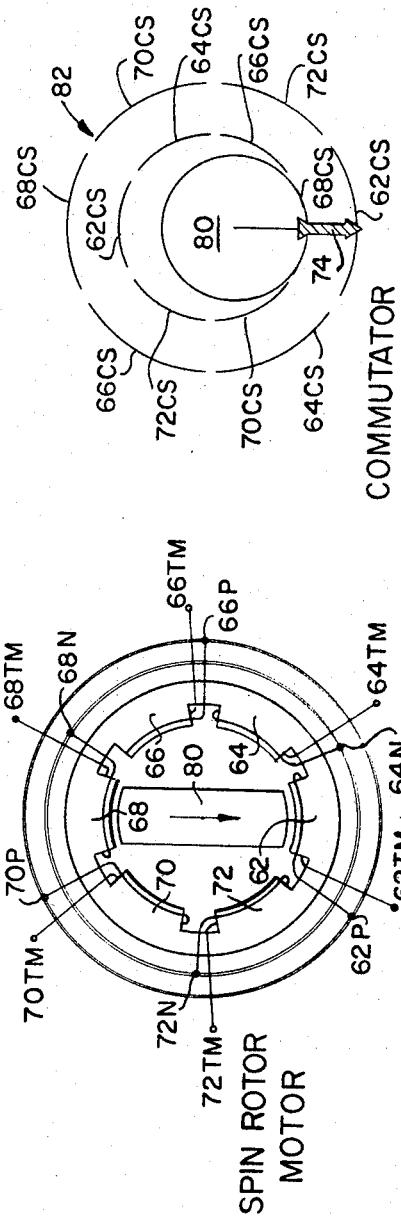
FIG. 3 COMMUTATOR
FIG. 4 SPIN ROTOR MOTOR
INVENTOR
JOHN F. GIFFORD
BY
ATTORNEYS

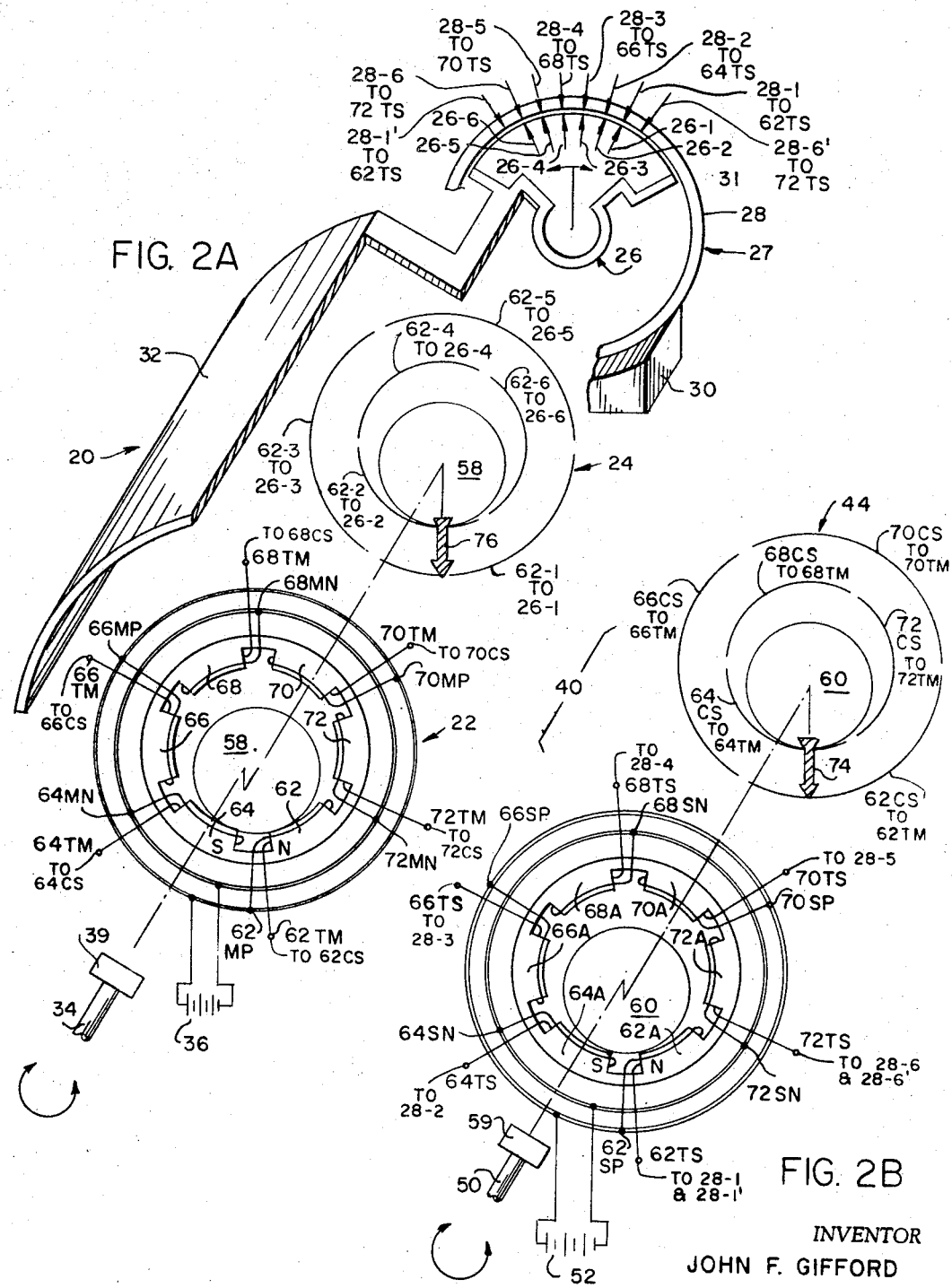

INVENTOR
JOHN F. GIFFORD

Oct. 1, 1968

J. F. GIFFORD 3,404,323

CLOSED LOOP STEPPING SERVOMOTOR SYSTEM

Filed March 10, 1964

6 Sheets-Sheet 4

INVENTOR
JOHN F. GIFFORD

BY

ATTORNEYS

INVENTOR
JOHN F. GIFFORD

BY

ATTORNEYS

United States Patent Office 3,404,323
Patented Oct. 1, 1968

3,404,323
CLOSED LOOP STEPPING SERVOMOTOR SYSTEM
John F. Gifford, P.O. Box 117, Sandoval, N. Mex. 87048
Filed Mar. 10, 1964, Ser. No. 350,828
10 Claims. (Cl. 318—18)

The present invention relates to a motor system, and more particularly to a master-slave motor system wherein rotation or translation of the shaft of the master motor is duplicated by the rotation or translation of the shaft of the slave motor.

Certain portions of the subject matter disclosed hereinafter are claimed in continuation-in-part application Ser. No. 492,197, filed July 15, 1965.

This invention is particularly useful in devices requiring the duplication of motion, such as prosthetic devices and mechanical limbs, especially those used in the operation of radiation hotcells, and such as remote controlled antenna rotators. In the field of high speed rocketry, master-slave motor systems are used in the operation of remote telemetering devices.

Remote electro-mechanical arms used in radiation hotcells typically have six independent variables of motion. These six motions are usually powered by six electric motors and controlled by manual operation of twelve or more pushbuttons. There is extreme unnaturalness and mental complexity in attempted simultaneous operation of the six variables by pushbutton. As a result, such devices are slow and difficult to operate.

Purely mechanical arms called "master-slave manipulators," in contrast to motor-driven arms, are simple and quick to operate. The six independent variables of motion are operated simultaneously and without mental process, since the in-cell manipulator simply duplicates all motions of the hand controlling the master-arm outside the cell.

Existing electric "master-slave manipulators" have been based on available motors and motor systems. The "selsyn" type motor provides master-slave relationship between two motors, but for its size and weight the torque and horsepower are low for such use, and the fact that its indexing error increases with load is a disadvantage. Various "stepping motors" have adequate torque, and are position-controlled, but do not give "feed-back" information to the master control to confirm their true positions. Other systems of motors have been used successfully, but require, for a single manipulator, a large console of complex electronic control equipment, using up to hundreds of components.

The motor system of this invention provides a direct master-slave relationship between two or more motors, of a kind susceptible to use at high indexing accuracy and at high torque, without the need for electronic control consoles.

In remote telemetering devices it is desired that an indicating shaft duplicate the speed and angular position of a purely mechanically driven shaft at a remote location or it is desired that an indication shaft exactly duplicate the motion of the shaft of an electrically self-actuated variable-speed motor.

The motor system of this invention may be operated in either of the two above modes of operation. The slave shaft duplicates the motion of either (a) an electrically self-actuated, variable-speed master motor shaft, or (b) a purely mechanically driven master motor shaft. In either mode of operation, a "feed-back" signal is provided from the slave to the master, giving positive confirmation that the slave shaft has followed the motion of the master shaft.

The object of this invention is to provide a mechanically actuated master-slave motor system, such that when the shaft of the master motor is actuated by an outside force, either electrical or mechanical, the shaft of the slave motor will not only accurately reproduce this shaft motion but will transmit an indication thereof to the master motor.

A further object of this invention is to provide a switch-actuated master-slave motor system, such that when the master motor is powered, the shaft of the slave motor will accurately reproduce the motion of the shaft of the master motor.

A further object is to provide an electric master-slave motor system, of electrically self-actuated type, wherein external torque or load placed upon the shaft of the slave motor is not directly transferred as a torque or load upon the master motor, thus permitting a small master motor to control a large slave motor.

A further object is to provide a master-slave motor system wherein the indexing error between the master shaft and the slave shaft is in no way proportional to the load upon the slave.

A further object is to provide a master-slave motor system wherein a "feed-back" signal is provided from the slave to the master, giving poistive confirmation that the slave shaft has followed the motion of the master shaft.

A further object of this invention is to provide a master-slave motor system of electrically self-actuated type, wherein the slave motor may be electrically locked in one position under load, started, stopped, reversed, or operated at variable speeds by appropriate drive of the master motor.

A further object of this invention is to provide a master-slave motor system whereby the ratio of turns or translation of the shaft of the master motor to turns or translation of the shaft of the slave motor may be controlled by the use of differing types of rotors or translating armatures, or numbers of field poles in the master and in the slave motors.

Yet another object of the invention is to provide motors of this type wherein the steps per revolution of the motor may be varied as desired and made as many as desired.

Figure 6:
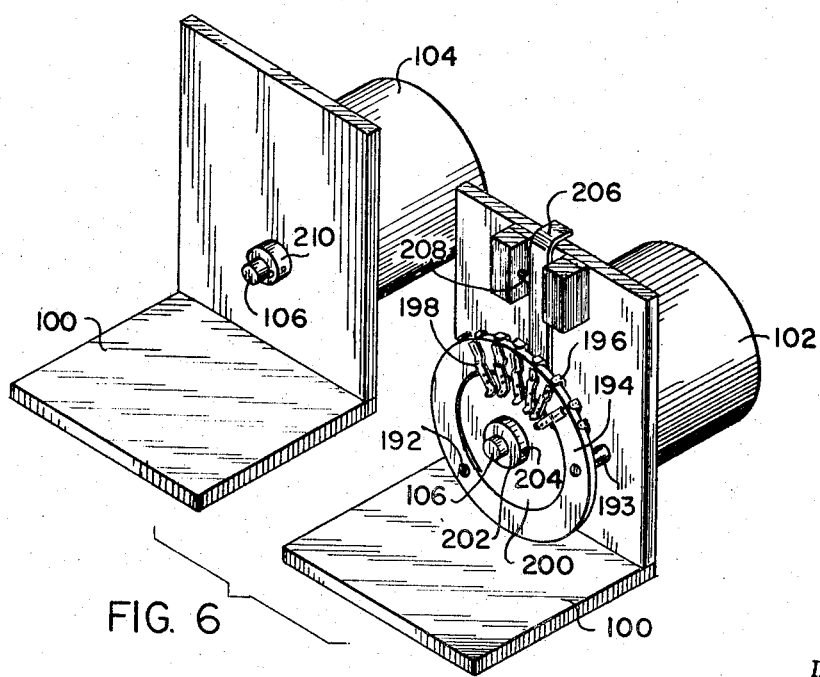
Figure 7:
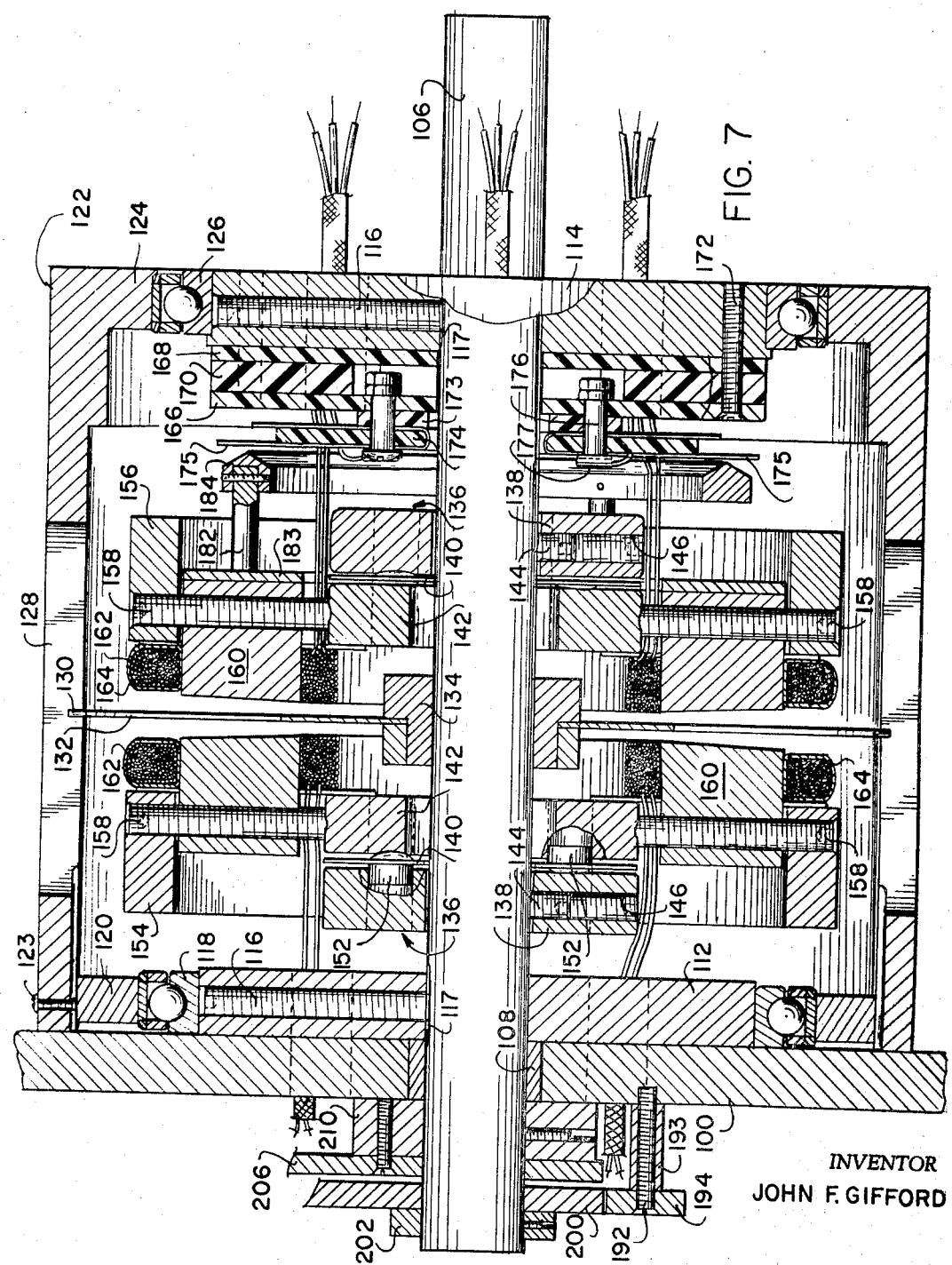
Figure 8:
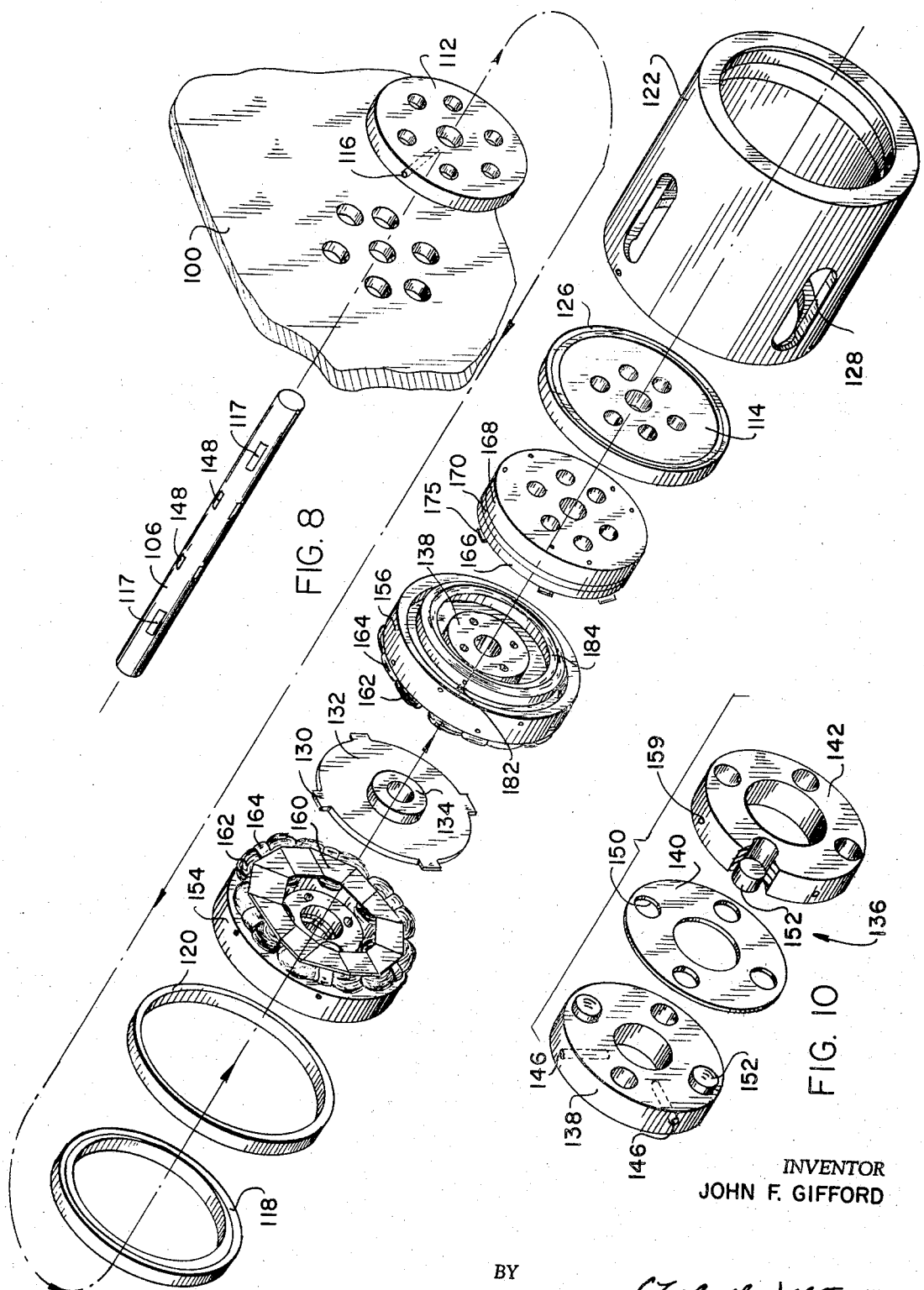
Figure 9:
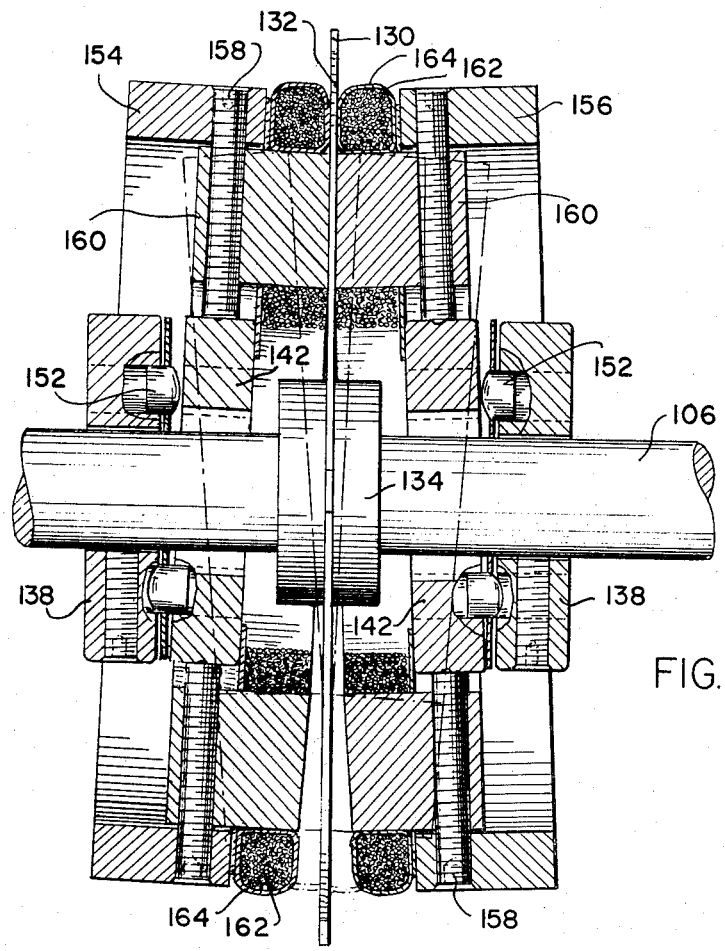

Other objects and advantages of this invention will be apparent from the following description of a preferred embodiment of the invention in conjunction with the accompanying drawings, wherein:

FIG. 1 is a block diagram of a master-slave motor system, with a rotary switch mounted for operation in a mechanically actuated mode;

FIGS. 2A and 2B, schematic diagrams of the various sections of the master slave motor system shown in FIG. 1, and depicting a rolling rotor type of armature in both the master motor and the slave motor;

FIG. 3, an appropriate type of commutator used to actuate the spinning rotor armature;

FIG. 4, a schematic of a type of axially mounted rotor armature which may be used in either or both of the motors;

FIG. 5, a modified form of master and slave motor mounted (for convenience of explanation) on adjacent supports and with one of motors shown with its casing partly removed;

FIG. 6, a rear view of the modified master and slave units of FIG. 5;

FIG. 7, a section through one of the motors of FIG. 5, the motor being unenergized;

FIG. 8, an exploded view of the parts of the motor shown in FIG. 7;

FIG. 9, a sectional view of a portion of one of the motors showing the position of parts when the motor is energized;

FIG. 10, an exploded view of a coupling forming part of the motor unit; and

Figure 11:
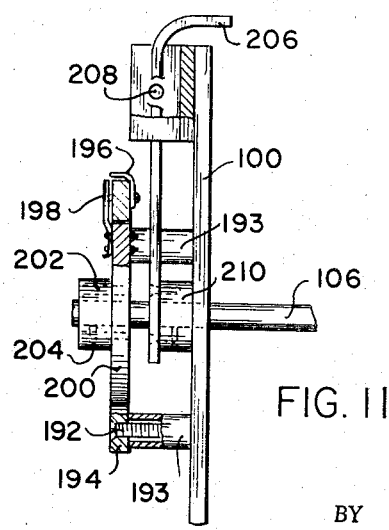

FIG. 11, a section showing the oscillatory switch arrangement on the back of a master motor shaft.

Referring to drawings in greater detail, in FIG. 1 master motor 20 is divided into four specific sections: field section 22 (containing an armature), commutator section 24, input side 26 of oscillatory switch 27, and output side 28 of the oscillatory switch and which last part only is attached to base 30. The three sections 22, 24 and 26 are all rigidly mounted within a motor shell 32. Motor shell 32, containing sections 22, 24 and 26, is designed to be free to rotate a few degrees with respect to fixed section 28, as by resting on an arcuate bracket 33 extending from the base, the free end of the bracket having an upstanding arcuate portion 35 engaged in a groove 37 in the shell. A rotor shaft is shown at 34. Power, preferably direct current, is supplied by a source 36 to field section 22, the source here being shown diagrammatically as a battery.

Slave motor 40 consists of field section 42 (containing an armature), and commutator section 44, both mounted within a motor shell 46 fixedly supported by base 48. The slave motor rotor shaft is shown at 50. Direct current power is supplied by source 52, here shown as a battery, to field section 42.

The contacts 28–1, etc., of the output side of oscillatory switch 27 are electrically connected to field section 42 of the slave motor by cable 54, and the contacts of commutator section 44 of the slave motor are electrically connected to field section 22 of the master motor by cable 56.

FIG. 1 depicts one form of the invention. In this form of the invention the output side 28 of the oscillatory switch 27 is used as a mounting base and fixed reference, and master motor 20 itself is mounted upon the input side 26 of the switch in such a manner that turning shaft 34 while the rotor is electro-magnetically held against rotation with respect to the field section 22 and commutator section 24 (both of which are fixedly mounted in rotary shell 32) will result in turning motor shell 32, carrying with it the input side of the switch 27, thus altering the effective sequential position of contacts in the switch, as will be explained, to differently connect these contacts with driving coils in the slave motor, causing the slave motor rotor shaft 50 to move a step, as will also be explained.

Referring specifically to FIGS. 2A and 2B, the particular arrangement shown for master motor 20 and slave motor 40 is arbitrarily based upon a six-pole field arrangement in the master motor and a like arrangement in the slave motor and upon respective rolling rotor armatures 58 and 60. Rolling rotors 58 and 60 are connected to their respective shafts 34 and 50, by eccentrically-flexible joints 39 and 59, such as flexible shafts, double universal joints, bellows, Oldham couplings or the like. Thus when rolling rotor 58, for example, rolls around inside the larger circle of pole pieces 62 to 72 through a complete clockwise arc of 360°, its shaft 34 will be rotated counterclockwise by only a small angular increment, such as 1/10 degree or 1 degree, depending upon the relative diameter of rolling rotor 58 to the circle of the pole pieces.

In master motor 20 there are field coils 62, 64, 66, 68, 70 and 72. In the master motor one terminal of each alternate coil, as terminals 62MP, 66MP and 70MP of coils 62, 66 and 70 is connected to the positive pole of battery 36. The other terminals 62TM, 66TM and 70TM, of these coils, are connected to the commutator section of slave motor 40 via cable 56. Also one terminal of each of the remaining coils on the master motor, designated as 64MN, 68MN and 72MN is connected to the negative terminal of battery 36. The other terminals, 64TM, 68TM and 72TM of these last coils, are also connected via cable 56 to the commutator section of slave motor 40. The coils of the master motor are so wound that when the TM terminals of adjacent coils are connected together the poles of adjacent coils will be of opposite polarity.

For example, if terminals 62TM and 64TM were connected together, the poles of coils 62 and 64 directed toward the rotor of master motor 20 would be so energized that one is a north and the other a south magnetic pole. These terminals are connected together by reason of contact closure in the commutator section of slave motor 40.

The commutator sections in the slave motor consist of concentric overlapping commutator segments 62CS, 64CS, 66CS, 68CS, 70CS and 72CS. In the master motor a like structure exists and the segments therein are designated as 62–1, 62–2, 62–3, 62–4, 62–5 and 62–6. In each of these commutators, in the example shown, the segments are arranged in two concentric circles, three in each circle, and with the segments in one circle overlapping the segments of the other circle. Each rolling rotor is provided with a peripheral conducting ring, depicted schematically as a double arrow shown at 74 and 76, at point of momentary rolling contact with segments of inner and outer circles, and called hereafter "shorting bar."

The lead from coil 62 in the master motor is connected to its terminal 62TM and to the slave motor commutator segment 62CS. The lead from coil 64 is connected to terminal 64TM and to segment 64CS, that from coil 66 to terminal 66TM and to segment 66CS and so on. Consequently, in any position of the shorting bar 74, a pair of coils in the master motor is serially connected together and both coils are in series with the source of potential 36.

For example, in the position illustrated in FIGS. 2A and 2B, current will flow from the positive terminal of source 36 to terminal 62MP, coil 62, to terminal 62TM, cable 56, to slave motor segments 62CS, shorting bar 74, segment 64CS, to cable 56 and master motor terminal 64TM, coil 64, terminal 64MN and to the other side of the source of potential. Since coils 62 and 64 are so wound about their respective poles to present opposite polarities to the rotor, the rotor will be magnetically attracted to these poles rather than to any other of the six poles. If the shorting bar 74 be rolled one step forward or backward so that it bridges the next pair of commutator segments, as segments 64CS and 66CS, then the leads from coils 64 and 66 of the master motor and which are connected to the slave motor commutator would be connected together and current would then flow from source 36 through the series connected coils 64 and 66 pulling the rolling rotor 58 to its next position. It is to be understood that all alternate poles in the two motors are of opposite polarity by reason of coil winding.

The rotor in the slave motor is caused to roll by reason of sequential excitation in the slave motor of different adjacent pairs of coils, as 62A, 64A, or 64A, 66A, these coils being connected via terminals 62SP and 64SN or 64SN and 66SP to the source of potential 52 in a manner similar to the connections of the coils in the master motor. While one terminal of each coil is connected to the source of potential, positive or negative as the case may be, the opposite terminals of the coils are connected to master motor contacts 28–1 and 28–1', 28–2, 28–3, 28–4, 28–5, 28–6 and 28–6' on the fixed element or output side 28 of the switch 27. The connections are terminal 62TS to contacts 28–1 and 28–1', terminal 64TS to contact 28–2, terminal 66TS to contact 28–3, terminal 68TS to contact 28–4, terminal 70TS to contact 28–5 and terminal 72TS to contacts 28–6 and 28–6'. In a neutral position of the oscillatory switch 27, six contacts are opposite contacts numbered as 1 to 6, as shown in FIG. 2A, these six contact being mounted on the portion of the switch which oscillates with the shell. The contacts on the oscillatable portion of the switch are connected respectively to master motor segments 62–1 to 62–6, as indicated.

Therefore, in the neutral position, contacts 26–1 to 26–6 on the oscillatable portion 26 of switch 27, and in the position wherein shorting bar 76 bridges segments 62–1 and 62–2, current will flow through the coils of the slave motor as follows: From the positive pole of battery 52 through coil 62A, terminal 62TS, cable 54, contacts 28–1, 26–1, the line to segment 62–1, segment 62–1, shorting bar 76, segment 62–2, via a connecting line to contact 26–2, thence to contact 28–2, cable 54, to terminal 64TS, coil 64A and thence back to the negative pole of battery 52. Thus the permeable rotor 60 will be held by magnetic attraction against the pole pieces related to coils 62A and 64A.

Should the oscillatory switch element 26 now be shifted clockwise or counterclockwise, the current flow through the coils of the slave motor would be changed so that instead of coils 62A and 64A being energized, one of these coils and another adjacent coil would be energized. For example, were input side 26 of switch 27 shifted clockwise, as viewed in FIG. 2A, contact 26–1 would close on contact 28–6' and contact 26–2 would close on contact 28–1. Thus, following the circuits as heretofore, it will be found that current now flows through slave motor coils connected to contacts 26–1 and 28–6', namely coils 62A and 72A, resulting in magnetically rolling the slave motor rotor 60, counterclockwise, through an arc of 60°. In doing so, however, the shorting bar 74, fixed on the rotor, rolls counterclockwise to bridge segments 62CS and 72CS rather than 62CS and 64CS.

The result of the roll of the shorting bar and change of shorting of segments is to shift the energization of the coils in the master motor as will be understood from our previous detailed recitation of connections, causing coils 62 and 72 to be energized rather than coils 62 and 64. This causes a roll of all movable parts of the master motor, should the rotor be held stationary, restoring switch 27 to its neutral position and shifting contact segments 62–6 and 62–1 into contact with shorting bar 76. This is possible because element 26 of the switch and segments 62–1 to 62–6 are rigid with and move with the shell 32 of the master motor, while shorting bar 76 is rigid with rolling motor 58, which is mounted on shaft 34 via flexible coupling 39.

In the slave motor, the pole pieces and coils are in a fixed support, as well as are the contact segments, while only the rotor 60 with its rigidly secured shorting bar 74 are removable. Thus, were shaft 34 of the master motor held rigidly by the hand and turned a step clockwise sufficient to cause a shift of the oscillatory switch contacts (since the magnetization current would magnetically tie internal motor parts together), the exchanging of the energization of the coils in the slave motor would result in a roll of its rotor 60 and a change in the shorting of the slave motor segments. This in turn would energize different ones of the coils of the master motor, and, because the shaft 34 is held against rotation by the hand of the operator, a counterclockwise rotational movement of the shell would take place through a relatively small angle restoring the switch element 26 to neutral position and producing concomitant rolling movement of rotor 58 and with it the shorting bar 76 one segment with respect to the switch through a relatively large angle (60 degrees). The process may of course be repeated any number of times by manually or otherwise turning the shaft 34 of the master motor further in the same direction after each restoration of the switch input section 26 to the neutral position so as to produce a progression of stepwise movements of the slave rotor 60 and of the rotor 58 and shorting bar 76 at a speed determined by the repetition frequency at which switch 27 is reactuated. Of course if the shell 32 (hence the movable switch section 26) is itself held in either of the two opposed actuation positions and the rotor (including shaft 34) is free to turn, the slave motor will continue to advance unidirectionally, and with it the master motor shaft and rotor, until such time as the swich section 26 is restored to the neutral position depicted in FIGURE 2A. It will therefore be evident that the arrangement inherently permits either described mode of operation.

It should be noted that since the coils in the slave motor are connected with the master motor only through electrical contacts in the master motor and are independently powered by battery 52, the torque applied to the shaft of the master motor is in no manner related to the torque in the slave motor, the torque in the latter being determined, at least for the major part, by the magnetization of its coils, the saturation of the stator and other well known facts. Further, since the restoration of the shell of the master motor can only take place after an incremental rotation of the rotor of the slave motor and a shift in shorting of different contact segments in the slave motor, there is a positive indication transmitted to the master motor that the slave motor had functioned.

In FIGS. 3 and 4, the same type of motor system is depicted as in FIG. 2A with the exception that spinning rotor 80 replaces rolling rotor 58 of the master motor. The same type of rotor may replace the rotor 60 of the slave motor.

Rotor 80 is preferably driven by diametrically opposed electromagnetic poles rather than by adjacent poles used with rolling rotor 58. Segmental commutator 82, either in the master or slave motor, which is desirable to actuate spinning rotor 80, is shown as of the rolling type although it could be of either the spinning or rolling type. If the rotor be of the spinning type and the segmental commutator be of the rolling type, the shaft coupling between the two may include an Oldham coupling or flexible shaft to permit the offsetting action of the two shafts. Connections between the segmental commutator of FIG. 3 and its associated master motor coils follow the principles hereinbefore set forth. Segmental commutator contacts 62CS, 64CS, 66CS, etc. are connected, respectively to motor field coil terminals 62TM, 64TM, 66TM, etc. In the position shown, shorting bar 74 connects together contacts 62CS and 68CS, and therefore energizing opposite poles in the master motor. However, if shorting bar 74 were to roll or turn 180 degrees, segments 62CS and 68CS would also connect together the same terminals of the coils in the master motor, thus energizing the same opposing poles. Thus the ratio of turning of master motor to slave motor may be varied, depending on the "rolls-per-revolution" ratio of the rolling-rotor motor, and the numbers of pole pieces and commutator segments used in both spinning and rolling rotor motors.

A linear translation armature may be arranged schematically as the rotor motors of FIGS. 2A and 2B except that the orientation of magnetic driving poles as well as commutator contacts and sequencing switch contacts, would be along a straight line, rather than along a circle. In that case it is preferable that the translating armature slide in bearings, rather than roll.

Thus interconnections may be made between motors having translating, conically rolling, cylindrically rolling, or rotating armatures.

Another form of the invention is depicted in FIGS. 5 to 11.

In FIG. 5, for purposes of illustration only, the motors are each mounted on an angle bracket 100 suitably fastened to a support (not shown). The master and slave motors, for simplicity of manufacture, are the same except for the association with the master motor of an oscillatory switch organization. The master motor is indicated as 102 and the slave motor as 104.

Each of the motors, see FIG. 7, comprises a shaft 106 rotatably extending through a bushing or bearing 108 in the vertical wall of the angle bracket. Mounted on this shaft is a pair of circular end plates 112 and 114, these plates being immovably affixed to the shaft by screws 116 threaded in the plates and engaging flats 117 on the shaft. The end plate 112 is perforated as is the bracket 100 to permit wires to be threaded therethrough to feed the coils in the motor shell. The plate 112 has a roller bearing 118 press fitted thereon on which, in turn, is press fitted a ring 120.

A cylindrical motor shell 122 is affixed to ring 120 by screws 123 and spans the gap between the end plates. The shell has, at the end adjacent end plate 114, an inwardly turned flange 124. A second ball bearing 126 between the end plate 114 and shell flange 124 non-frictionally rotatably supports the shell. The cylindrical shell is provided with a number of slots 128, running parallel to the axis of the shell, here shown as four in number and spaced 90° from each other, these slots being engaged by projections 130, see FIG. 8, of a driven disk 132 firmly embedded in a hub 134 rotatably mounted on shaft 106.

Mounted on the shaft, on each side of disk 132, is a flexible coupling 136. One of the flexible couplings is shown in exploded view in FIG. 10. It comprises a hub or cylindrical body 138, an intermediate circular resilient diaphragm 140 and a cylindrical support body 142. Each hub 138 is adjustably mounted on shaft 106 and fastened thereto by screws 144 in threaded bores 146 on the hubs and bearing against flats 148 on the shaft 106. The body 142 has a large central opening of size sufficient to allow free tilting movement of the body relative to the shaft. The diaphragm 140 has two pairs of diametric holes 150, the holes being spaced 90° from each other, and the bodies 138 and 142 have two pairs of pins 152 located to be positioned in the diaphragm holes and are fastened thereto with the diaphragm spaced from each of the bodies an equal distance. Since the diaphragm is of resilient material and the body or hub 138 is fixed on the shaft, the body 142, by a distortion of the diaphragm, can be operated to a tilting position relative to the shaft. The central aperture in the diaphragm is sufficiently large to allow said tilting movement.

Supported by each of the tiltable bodies 142 is a ring, see FIG. 7, the two rings being indicated as 154 and 156. The rings are spaced from the bodies 142 by spacing and fixing screws 158 threaded through the rings and abutting the bodies 142. The outer surface of each body 142, see FIG. 10, for the purposes of properly locating the screws, is provided with dimples 159.

Supported by each screw 158 is a pole piece 160. In the embodiment shown there are six equally spaced pole pieces within each ring 154 and 156, these pole pieces being directed toward the diaphragm 132. Surrounding each pole piece is a field coil 162, suitable fiber pieces 164 being incorporated in the structure to mechanically protect parts against abrasion and the like.

FIG. 7 illustrated the position of parts when the coils are not energized. When the coils are energized, see FIG. 9, the pole pieces are attracted to the diaphragm 132. Since opposed coils on the two rings are so wound as to present poles of opposite polarity to each other, the opposed pole pieces will also attract each other, when the coils are energized.

As in a previous embodiment, means are provided to energize adjacent pairs of coils, at will, so as to cause attraction of progressively (or retrogressively) related coils to each other, thus pinching the diaphragm 132 progressively at different circumferential areas of the diaphragm. The action of progressively energizing pairs of adjacent magnetic coils is to cause the edges of the coils to have a rolling action on the diaphragm in the selected direction, this in turn causing a backward angular movement of the diaphragm, the angular amount of backward movement being a function of the degree of inclination of the rings 154 and 156 toward each other when the coils are energized.

The angularity may be predetermined by adjusting the hubs 138 along the length of the shaft 106. The nearer the hubs 138 are to the diaphragm 132 the more nearly vertical is the attracted position of the coils and the less the backward rotation of the diaphragm as the coils are successively energized. Thus the degree of motion of the diaphragm may be selected irrespective of the fact that the coils are fixedly positioned 60° from each other. It will be noted that because of the teeth or projections 130 on the diaphragm and cooperating slot structure in the shell, angular creeping of the diaphragm will rotationally carry with it the shell 122 and the shell will be angularly displaced relative to the coils. Since the coils are, in effect, fastened to the shaft, relative motion takes place between the shaft and shell. When the shell is held against rotation by the hand, reactive forces will cause the shaft to rotate. Rotation of the shaft under the circumstances will result in restoration of an oscillatory switch equivalent to the switch 27.

Both the master motor and the slave motor have mounted within the shell a commutator switch equivalent to the segment commutator of the previous embodiments and having a movable contact carrying portion rotatable with the shaft and a non-movable fixed contact carrying portion. The structure of these commutator switches and how they are operated will now be explained.

The non-movable portion, see FIG. 7, comprises two fiber disks 166 and 168, separated from each other by a fiber spacing ring 170, the assemblage being mounted on end plate 114 by screws 172. Mounted on the disk 166 is a spacing rim 173 against which lies a contact carrying disk 174. Each of six equally spaced apart contacts 175 is supported on said disk 174 by being bent in the form of a U-clip embracing said disk and being held to the disk 174 by a screw 176, said screw also passing through a wire terminal 177. The wires connected to these terminals pass through openings in the fiber plates and end plates 114 and correspond in number and function and have connections to coils of the other motor of the pair as in the case of the commutator segments in FIGS. 2A and 2B.

Supported by posts 182 extending from a backing ring 183 fixedly mounted with respect to the coils is a conductive arris edged ring 184. In the attracted position of the coils (as in FIG. 9), the ring 184 would press against two fixed contacts 175. As the ring 156 wobbles around, so does the ring 184 causing different ones of the contacts 175 to be shorted together. The ring 184 functions very much like the shorting bar 74 or 76 in the previous embodiments.

The bracket mount for the master motor, see FIG. 6, has affixed thereto, as by screws 192, passing through spacing posts 193 and threaded into bracket 100, an insulating ring 194. The ring mounts eight contacts 196, contacted by six contact blades 198 on a circular disk 200 having a hub 202 fastened to the shaft 106 as by screws 204 threaded through the hub and bearing against shaft 106. The six contact blades, oscillatable with oscillation of shaft 106 and the eight fixed contacts are wired, as explained in conjunction with the contacts 28–1, 28–1', 28–2, etc. and associated contacts 26–1, 26–2, etc. in FIGS. 2A and 2B, the six oscillatable blade contacts of FIG. 6 being connected to the fixed contacts 174 in the master motor, and the eight fixed contacts being connected to each other as needed and to the field coils of the slave motor.

It will thus be clear that an angular displacement of shaft 106, as by hand, will effect a change of contacts between the contact blades 198 and the fixed contacts 196 on the ring, thereby chainging the energization of the coils in the slave motor. In the slave motor a changing of the energization of the coils causes different ones of the opposing pairs of coils to be attracted to each other, wobbling the ring 184 in the slave motor, whereby different contacts are closed to energize different coils in the master motor. Because of the pinching action of the coil structures on the diaphragm 132, the diaphragm will rotate, carrying with it, via the projections 130, the motor shell. The operator may stop comparable rotational movement of the slave motor shell and of the master motor shell by restoring the shaft 106 to a neutral position. For this purpose the shaft of the master motor may have fastened to it a handle 206 oscillatable between two positions as limited by stop screws 208, the oscillation of the handle in either direction from neutral causing either forward or reverse rotation of the wobble rings by suitable sequential energization of the coils. The hub 210 of the handle is secured to the shaft and is close to the support 100 to prevent endwise movement of the shaft in the support.

In use, if desired, the creeping rotation of the shell of the slave motor may be used to lift heavy weights or operate heavy parts by winding one end of a cable about the shell and attaching the other end of the cable to the load, and the master motor to register the changing position of the slave motor and its load.

The ratio of rotational turns of the shaft of the master motor to the rotational turns of the shaft of the slave motor can be controlled by the use of differing types of rotors in the master motor and in the slave motor. As an example, spinning rotors may be used to establish low torque at high speeds. Also, a high-speed spinning rotor can be used in either the master motor or in the slave motor, with a low rotational-speed rolling rotor in the other. This establishes a high ratio of rotational turns between the two shafts. In all cases the relative pitches of the commutators in each of the motors and the relative pitches of the coils in the other motor with which they respectively cooperate determine the rotational turns ratio between the motors. This is due of course to the fact that with each pitch distance of rotation of the slave motor there must be a consequent pitch distance of rotation of the master motor in order to recircuit the slave motor coils for further rotation of the slave motor, assuming the control switch is held in or restored to the motivating position.

Alternate to the two-motor master slave system, the motor system may consist of three, four, or more motors connected as a sequential series. In this system, the commutator of the first slave motor controls the armature position in the second slave motor. The commutator of the second slave motor controls the armature position in the third slave motor, and so on. In all of these systems, the commutator of the last slave motor in the series controls the armature position of the master motor.

The relationship of the diameter of the rolling rotor to the stator pole pieces may be selected to provide a desired number of steps per revolution. The diameter ratio of the rolling rotor to the pole pieces would appear to be useful from at least about 0.500 to approximately 0.9999. In the range of 0.990 to 0.999 an increasingly high driving torque with a higher number of steps per revolution is achieved. As an example, a stator pole piece in a diameter 3.000 inches and a rotor diameter of 2.990 inches provides a ratio of rolls per revolution of approximately 300 to 1. With a six pole stator this provides 1,800 steps per revolution. The region of close diameters is especially valuable for high torque and precise angular positioning.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. In combination, a master motor and a slave motor, each having relatively movable members, an oscillatory switch forming part of the master motor, means connected for changing the condition of said switch from an original condition by displacement of one such member of the master motor in a predetermined direction, means responsive to said change of switch condition for effecting a change in energization of the slave motor in order to drive the same, a commutating switch in the slave motor, means responsive to said change in energization of the slave motor to operate the commutation switch therein, and means operative in response to said commutation switch operation to drive the master motor members relatively in a predetermined direction.

2. In combination, a master motor and a slave motor, an oscillatory switch forming part of the master motor, a commutator switch in said master motor having commutating segments affixed to the shell of said motor, a bridging bar fixed to the rotor of the master motor in position to bridge different pairs of said segments as the rotor is rotated relative to the shell, said slave motor having a similar commutator switch and bridging bar, field coils in each motor, means connecting the oscillatory switch of the master motor with the field coils in the slave motor to energize different pairs of said field coils in the slave motor depending upon the position of said oscillatory switch, and means connecting different segments of the slave motor with different coils of the field coils in the master motor, whereby upon operation of the oscillatory switch, the rotor operated bridging bar in the slave motor will be rotated to short different segments in the slave motor and whereby the bridging bar of the segments in the slave motor will energize different pairs of the coils in the master motor to shift the bridging bar of the master motor to a new position, and means in the circuits of the oscillatory switch, segments and coils to furnish power thereto.

3. In a master-slave motor system, a master motor and at least one slave motor, said master motor having relatively movable members, movable means connected to a movable member of the master motor and energizingly connected to the slave motor for effecting a step movement of the slave motor in response to displacement of such movable member, and means under control of the slave motor and energizingly connected to the master motor upon making said step movement for energizing the master motor to drive its members in a predetermined direction relatively, and means in the master motor operable in response to such relative motion of the master motor members for conditioning said slave motor for a subsequent further step movement.

4. A slave motor, a master motor having a fixed base carrying stationary contacts, a shell rotatable with respect to said base and having movable contacts cooperating with said fixed contacts to complete circuits to said slave motor, field coils fixed to said shell, segmental contacts within said shell fixed to said shell, said segmental contacts being connected with said movable contacts, a rotor within said shell having a bridging bar affixed thereto and in position to sequentially short the segmental contacts, and means to sequentially energize the coils to rotate the shell when the rotor is held stationary.

5. A master-slave motor system comprising a master motor having a non-movable portion carrying fixed contacts, an oscillatable portion carrying cooperating contacts, a sequencing switch having one part fixed to said oscillatable portion, a rotor, another part of said sequencing switch being fixed to said rotor, and field coils for said rotor fixed to said oscillatable portion, a slave motor having corresponding sequential switch portions, rotor and field coils, means interconnecting the stationary contacts on the master motor with the field coils in the slave motor and with a source of power, means interconnecting the sequencing switch in the master motor with the movable contacts on the oscillatable portion and means interconnecting the sequential switch in the slave motor with the field coils in the master motor and with a source of power.

6. A motor system comprising a master motor, a slave motor, each motor having cooperable relatively movable magnetomotive members including electromagnetic coil means in one such member distributed at predetermined pitch distance along the path of relative motion in such motor and operable upon selective energization of its coil means in successive order to motivate the members so as to effect relative movement between them by progressive increments related to said pitch distances therein, each motor having commutator means including relatively movable sections respectively movable with a different one of the relatively movable members of the motor, one such section having a contactor and the other section having separate contact elements successively engageable by said contactor and distributed at pitch distances related to those of the motor's coil means, circuit means including an electrical energy source connecting the separate contact elements of the slave motor commutator with the respective coil means of the master motor in sequential relationship, and circuit means including an electrical energy source, the master motor's commutator means and switch means for connecting the separate contact elements of the master motor commutator with the separate coil means of the slave motor in sequential relationship, said switch means including relatively movable switch sections one of which is connected for movement with one of the magnetomotive members of the master motor and the other of which is relatively stationary, one of said switch sections having contacts respectively connected electrically to different contact elements in the master motor's commutator in sequential relationship, the other of said switch sections having contacts arranged to simultaneously engage the first mentioned contacts, in a predetermined neutral position of the switch sections relatively, and connected to the respective coil means of the slave motor in sequential relationship, one of the switch sections having at least one additional contact connected to another contact of the section and positioned so that upon displacement of the switch sections relatively in one sense out of said neutral position, it will, with other contacts of the section, engage the contacts of the other switch section simultaneously so as to shift the coil means energization in the slave motor in one sense by a pitch distance as a result of such displacement, and thereby incrementally motivate the magnetomotive members in both motors.

7. The system defined in claim 6, wherein said one of the switch sections has still another contact connected to a different contact of the section and positioned so that upon displacement of the switch sections relatively in the opposite sense out of said neutral position it will, with other contacts of the section, simultaneously engage the contacts of the other switch section so as to shift the coil means energization in the slave motor in the opposite sense by a pitch distance as a result of such displacement, and thereby incrementally motivate the magnetomotive members of both motors reversely from that by the first-mentioned switch section displacement.

8. The system defined in claim 7, wherein the members of at least one motor are cooperably formed to permit bodily rolling contact between the members about a common axis at points of relatively different radius on each such member, whereby relative rotation between the members occurs at a slower angular rate than the rate of such rolling contact, and wherein the commutator means sections of that motor are connected to move relatively at the rolling contact angular rate.

9. In combination, a master motor, a slave motor, each motor having cooperable magnetomotive members operable to be moved relatively and to be held stationary relatively by magnetomotive force in response to electrical energization of one such member, circuit means including an energy source and selectively engageable electrical contact means in the master motor connected to energize one of the members in the slave motor so as to move such latter members relatively in response to displacement in an absolute sense of the members of the master motor, and circuit means including an energy source and selectively engageable electrical contacts in the slave motor connected to energize one of the members in the master motor so as to move the master motor members relatively in a sense corresponding to reverse displacement of said one member of the master motor.

10. The combination in claim 1, wherein the switch has cooperable sections and the master motor member connected to move the switch comprises a stator connected to one section of the switch, with means limiting its angular movement in an absolute sense, and wherein the other member of the master motor comprises a rotor movable beyond the limits of the stator, and connected with the section of the switch whereby holding of the stator fixedly in its displaced position causes restoration of the switch to its initial condition.

References Cited

UNITED STATES PATENTS

| | | | |
|---|---|---|---|
| 2,327,341 | 8/1943 | Drake | 318—27 |
| 2,798,190 | 7/1957 | Goodman | 318—31 |
| 2,941,137 | 6/1960 | Fehn | 318—539 |

BENJAMIN DOBECK, *Primary Examiner.*